(12) United States Patent
Forssell et al.

(10) Patent No.: US 10,313,323 B2
(45) Date of Patent: Jun. 4, 2019

(54) USER EQUIPMENT IDENTITY VALID FOR HETEROGENEOUS NETWORKS

(71) Applicant: Nokia Solutions and Networks Oy, Espoo (FI)

(72) Inventors: Mika Forssell, Porvoo (FI); Jari Pekka Mustajarvi, Espoo (FI); Hans Thomas Hoehne, Helsinki (FI); Subramanya Chandrashekar, Bangalore (IN); Gyorgy Tamas Wolfner, Budapest (HU)

(73) Assignee: Nokia Solutions and Networks Oy, Espoo (FI)

( * ) Notice: Subject to any disclaimer, the term of this patent is extended or adjusted under 35 U.S.C. 154(b) by 218 days.

(21) Appl. No.: 15/504,044

(22) PCT Filed: Aug. 28, 2014

(86) PCT No.: PCT/EP2014/068321
§ 371 (c)(1),
(2) Date: Feb. 15, 2017

(87) PCT Pub. No.: WO2016/029953
PCT Pub. Date: Mar. 3, 2016

(65) Prior Publication Data
US 2017/0264606 A1    Sep. 14, 2017

(51) Int. Cl.
*G06F 13/14* (2006.01)
*H04L 29/06* (2006.01)
*H04W 12/06* (2009.01)
*H04W 8/26* (2009.01)

(52) U.S. Cl.
CPC ...... *H04L 63/0815* (2013.01); *H04L 63/0281* (2013.01); *H04L 63/0892* (2013.01); *H04W 8/26* (2013.01); *H04W 12/06* (2013.01)

(58) Field of Classification Search
CPC ............. H04L 63/0815; H04L 63/0281; H04L 63/0892; H04W 8/26; H04W 12/06
See application file for complete search history.

(56) References Cited

U.S. PATENT DOCUMENTS

| | | | |
|---|---|---|---|
| 2009/0055899 A1 | 2/2009 | Deshpande et al. | 726/4 |
| 2011/0004758 A1* | 1/2011 | Walker | H04L 63/062 713/168 |
| 2014/0133298 A1* | 5/2014 | Han | H04W 28/08 370/230 |
| 2014/0321365 A1* | 10/2014 | Shoji | H04W 60/06 370/328 |

(Continued)

FOREIGN PATENT DOCUMENTS

| | | |
|---|---|---|
| EP | 2897441 | 3/2014 |
| JP | H-10-507883 | 7/1998 |

(Continued)

*Primary Examiner* — Ali S Abyaneh
*Assistant Examiner* — Paul E Callahan
(74) *Attorney, Agent, or Firm* — Harrington & Smith

(57) ABSTRACT

A method and apparatus may be configured to determine a network identity that is valid for the first network and a second network. The method may also include assigning the network identity to a user equipment. The method may also providing the network identity to one of the second network and a user equipment. The first network and the second network may be based on different technologies.

18 Claims, 17 Drawing Sheets

(56) References Cited

U.S. PATENT DOCUMENTS

| | | | | |
|---|---|---|---|---|
| 2014/0355562 A1* | 12/2014 | Gao | ................... | H04B 7/02 |
| | | | | 370/331 |
| 2016/0095036 A1* | 3/2016 | Stojanovski | ............ | H04W 4/08 |
| | | | | 370/331 |
| 2016/0105825 A1* | 4/2016 | Hedberg | ............. | H04L 63/0407 |
| | | | | 370/331 |
| 2016/0183139 A1* | 6/2016 | Meredith | .............. | H04W 36/14 |
| | | | | 455/432.1 |

FOREIGN PATENT DOCUMENTS

| | | |
|---|---|---|
| JP | 2014011678 A | 1/2014 |
| WO | WO-99/038290 | 7/1999 |
| WO | WO 2008/044215 A2 | 4/2008 |
| WO | WO 2012/094602 A1 | 7/2012 |
| WO | WO-2014/040574 | 3/2014 |
| WO | PCT/CN2013/083694 | 7/2015 |

\* cited by examiner

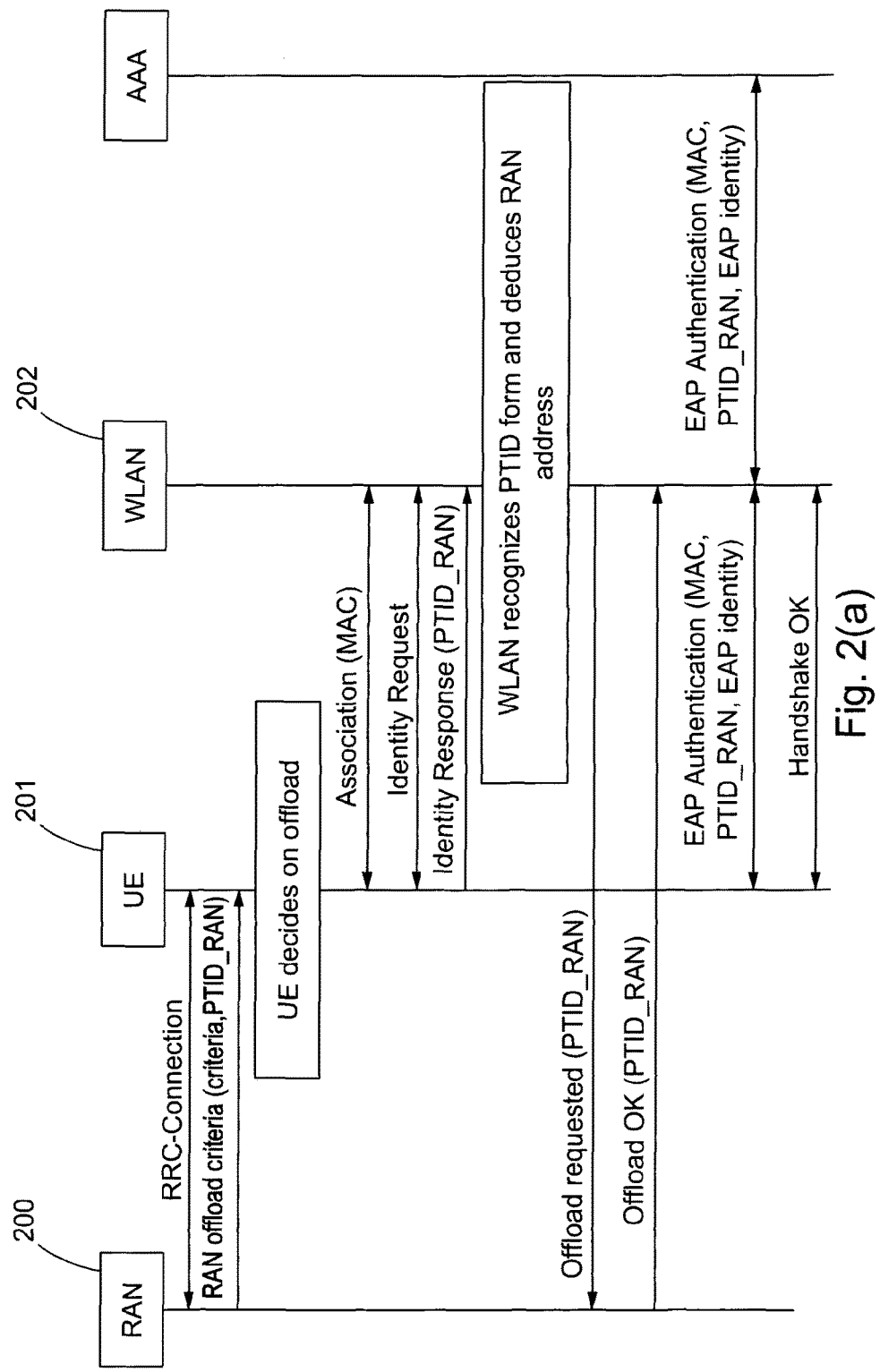

USER EQUIPMENT IDENTITY VALID FOR HETEROGENEOUS NETWORKS

BACKGROUND

Field

Embodiments of the invention relate to an identity for user equipment that may be utilized in heterogeneous networks.

Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may comprise determining, by a network node of a first network, a network identity that may be valid for the first network and a second network. The method may also comprise assigning the network identity to a user equipment. The method may also comprise providing the network identity to at least one node of the second network and a user equipment, wherein the first network and the second network may be based on different technologies.

In the method of the first embodiment, determining the network identity may comprise determining the identity by one of a home-service-subscriber or a node of a Radio-Access-Network.

In the method of the first embodiment, the first network may correspond to a Radio-Access-Network. The second network may correspond to a Wireless-Local-Area-Network.

In the method of the first embodiment, the network identity may correspond to a temporary offload identifier.

In the method of the first embodiment, the assigning the network identity to the user equipment may comprise assigning the identity when the user equipment associates with the first network or the second network after inactivity.

In the method of the first embodiment, the method may also comprise releasing the network identity from the user equipment after the user equipment detaches from the first network and the second network.

In the method of the first embodiment, providing the network identity to the second network may comprise attaching the identity to a radius message.

In the method of the first embodiment, the determining the network identity may comprise determining the identity based on an International-Mobile-Subscriber-Identity or an International-Mobile-Station-Equipment-Identity.

In the method of the first embodiment, the network identity may be constructed in a way that it can be identified by the second network or the user equipment.

In the method of the first embodiment, the network identity may comprise routing information.

In the method of the first embodiment, the routing information may comprise a serving node address. The serving node may be a node of the first network.

In the method of the first embodiment, the network identity may comprise a one time token.

In the method of the first embodiment, the network identity may comprise a heterogeneous network identity.

In the method of the first embodiment, the first network node may utilize the network identity to coordinate user equipment access with at least one of the second network and the user equipment.

According to a second embodiment, an apparatus may comprise determining means for determining a network identity that may be valid for the first network and a second network. The apparatus may also comprise assigning means for assigning the network identity to a user equipment. The apparatus may also comprise providing means for providing the network identity to at least one node of the second network and a user equipment. The first network and the second network may be based on different technologies.

In the apparatus of the second embodiment, the apparatus may comprise one of a home-service-subscriber or a node of a Radio-Access-Network.

In the apparatus of the second embodiment, the first network may correspond to a Radio-Access-Network, and the second network may correspond to a Wireless-Local-Area-Network.

In the apparatus of the second embodiment, the network identity may correspond to a temporary offload identifier.

In the apparatus of the second embodiment, the assigning the network identity to the user equipment may comprise assigning the identity when the user equipment associates with the first network or the second network after inactivity.

In the apparatus of the second embodiment, the apparatus may further comprise releasing means for releasing the network identity from the user equipment after the user equipment detaches from the first network and the second network.

In the apparatus of the second embodiment, providing the network identity to the second network may comprise attaching the identity to a radius message.

In the apparatus of the second embodiment, the determining the network identity may comprise determining the identity based on an International-Mobile-Subscriber-Identity or an International-Mobile-Station-Equipment-Identity.

In the apparatus of the second embodiment, the network identity may be constructed in such a way that it can be identified by the second network or the user equipment.

In the apparatus of the second embodiment, the network identity may comprise routing information.

In the apparatus of the second embodiment, the routing information may comprise a serving node address. The serving node may be a node of the first network.

In the apparatus of the second embodiment, the network identity may comprise a one time token.

In the apparatus of the second embodiment, the network identity may comprise a heterogeneous network identity.

In the apparatus of the second embodiment, the first network node may utilize the network identity to coordinate user equipment access with at least one of the second network and the user equipment.

According to a third embodiment, a computer program product may be embodied on a non-transitory computer readable medium. The computer program product may be configured to control a processor to perform a process according to a method of the first embodiment.

According to a fourth embodiment, a method may comprise receiving, by a user equipment, an assigned network identity. The network identity may originate from a first network and may be valid for the first network and a second network. The first network and the second network may be based on different technologies. The method may also comprise providing, by the user equipment, the network identity to the second network.

In the method of the fourth embodiment, the method may further comprise determining, by the user equipment, that network traffic of the user equipment may be to be offloaded from the first network to a second network.

In the method of the fourth embodiment, the method may further comprise offloading the network traffic of the user equipment to the second network after the second network authorizes the offloading.

In the method of the fourth embodiment, the network identity may comprise a temporary offload identifier assigned to the user equipment.

In the method of the fourth embodiment, the network identity may comprise a heterogeneous network identity.

In the method of the fourth embodiment, the receiving the assigned network identity may comprise receiving from a home-service-subscriber or a Radio-Access-Network node.

In the method of the fourth embodiment, the first network may correspond to a Radio-Access-Network, and the second network may correspond to a Wireless-Local-Area-Network.

In the method of the fourth embodiment, the temporary offload identifier may be based on a pseudorandom number.

In the method of the fourth embodiment, the user equipment may utilize the network identity to coordinate its access with at least one of the first network and the second network.

According to a fifth embodiment, an apparatus may comprise receiving means for receiving an assigned network identity. The network identity may originate from a first network and may be valid for the first network and a second network and the first network and the second network may be based on different technologies. The apparatus may also comprise providing means for providing the network identity to the second network.

In the apparatus of the fifth embodiment, the apparatus may further comprise determining means for determining that network traffic of the apparatus is to be offloaded from the first network to a second network.

In the apparatus of the fifth embodiment, the apparatus may further comprise offloading means for offloading the network traffic of the apparatus to the second network after the second network authorizes the offloading.

In the apparatus of the fifth embodiment, the network identity may comprise a temporary offload identifier assigned to the apparatus.

In the apparatus of the fifth embodiment, the network identity may comprise a heterogeneous network identity.

In the apparatus of the fifth embodiment, the receiving the assigned network identity may comprise receiving from a home-service-subscriber or a Radio-Access-Network node.

In the apparatus of the fifth embodiment, the first network may correspond to a Radio-Access-Network, and the second network may correspond to a Wireless-Local-Area-Network.

In the apparatus of the fifth embodiment, the temporary offload identifier may be based on a pseudorandom number.

In the apparatus of the fifth embodiment, the apparatus may utilize the network identity to coordinate its access with at least one of the first network and the second network.

In the apparatus of the fifth embodiment, wherein the apparatus may comprise a user equipment.

According to a sixth embodiment, a computer program product may be embodied on a non-transitory computer readable medium. The computer program product may be configured to control a processor to perform a process according to a method of the fourth embodiment.

According to a seventh embodiment, a method may comprise receiving, by a network node, a network identity. A user equipment may be associated with a first network, and the network node may correspond to a node of a second network, the user identity may be valid for the first network and the second network, and the first network and the second network may be based on different technologies.

In the method of the seventh embodiment, the method further may comprise determining whether the user equipment may be authorized to offload traffic from the first network to the second network.

In the method of the seventh embodiment, the receiving the network identity may comprise receiving the network identity from a user equipment or a node of the first network.

In the method of the seventh embodiment, the network identity may comprise a temporary offload identifier assigned to the user equipment.

In the method of the seventh embodiment, the network identity may comprise a heterogeneous network identity.

In the method of the seventh embodiment, the second network node may utilize the network identity to coordinate user equipment access with at least one of the second network and the user equipment.

In the method of the seventh embodiment, the first network may correspond to a Radio-Access-Network, and the second network may correspond to a Wireless-Local-Area-Network.

In the method of the seventh embodiment, the temporary offload identifier may be based on a pseudorandom number.

In the method of the seventh embodiment, the received network identity may be constructed in a way that it may be identified by the network element as a heterogeneous network identity.

In the method of the seventh embodiment, the network identity may comprise routing information and the network may extract the routing information.

In the method of the seventh embodiment, the routing information may comprise a serving node address. The serving node may be a node of the first network.

In the method of the seventh embodiment, the network identity may comprise a one time token.

According to an eighth embodiment, an apparatus may comprise receiving means for receiving a network identity. A user equipment may be associated with a first network, and the apparatus may correspond to a node of a second network, the user identity may be valid for the first network and the second network, and the first network and the second network may be based on different technologies.

In the apparatus of the eighth embodiment, the apparatus further may comprise determining means for determining whether the user equipment may be authorized to offload traffic from the first network to the second network.

In the apparatus of the eighth embodiment, the receiving the network identity may comprise receiving the network identity from a user equipment or a node of the first network.

In the apparatus of the eighth embodiment, the network identity may comprise a temporary offload identifier assigned to the user equipment.

In the apparatus of the eighth embodiment, the network identity may comprise a heterogeneous network identity.

In the apparatus of the eighth embodiment, the second network node may utilize the network identity to coordinate user equipment access with at least one of the second network and the user equipment.

In the apparatus of the eighth embodiment, the first network may correspond to a Radio-Access-Network, and the second network may correspond to a Wireless-Local-Area-Network.

In the apparatus of the eighth embodiment, the temporary offload identifier may be based on a pseudorandom number.

In the apparatus of the eighth embodiment, the received network identity may be constructed in a way that it can be identified by the network element as a heterogeneous network identity.

In the apparatus of the eighth embodiment, the network identity may comprise routing information and wherein the network extracts the routing information.

In the apparatus of the eighth embodiment, the routing information may comprise a serving node address, wherein the serving node may be a node of the first network.

In the apparatus of the eighth embodiment, the network identity may comprise a one time token.

In the apparatus of the eighth embodiment, the apparatus may comprise a wireless local area network access point or a wireless local area network controller.

According to a ninth embodiment, a computer program product may be embodied on a non-transitory computer readable medium, the computer program product configured to control a processor to perform a process according to a method of the seventh embodiment.

According to a tenth embodiment, an apparatus may comprise at least one processor. The apparatus may also comprise at least one memory including computer program code. The at least one memory and the computer program code may be configured, with the at least one processor, to cause the apparatus at least to determine a network identity that may be valid for a first network and a second network. The apparatus may also be caused to assign the network identity to a user equipment. The apparatus may also be caused to provide the network identity to at least one node of the second network and a user equipment, wherein the first network and the second network may be based on different technologies.

According to an eleventh embodiment, an apparatus may comprise at least one processor. The apparatus may also comprise at least one memory including computer program code. The at least one memory and the computer program code may be configured, with the at least one processor, to cause the apparatus at least to receive an assigned network identity. The network identity may originate from a first network and may be valid for the first network and a second network. The first network and the second network may be based on different technologies. The apparatus may also be caused to provide the network identity to the second network.

According to a twelfth embodiment, an apparatus may comprise at least one processor. The apparatus may also comprise at least one memory including computer program code. The at least one memory and the computer program code may be configured, with the at least one processor, to cause the apparatus at least to receive a network identity. A user equipment may be associated with a first network, and the apparatus may correspond to a node of a second network. The user identity may be valid for the first network and the second network, and the first network and the second network may be based on different technologies.

According to a thirteenth embodiment, a system may comprise a first apparatus comprising first determining means for determining a network identity that may be valid for the first network and a second network. The first apparatus may also comprise assigning means for assigning the network identity to a second apparatus. The first apparatus may also comprise first providing means for providing the network identity to at least one node of the second network and the second apparatus. The first network and the second network may be based on different technologies. The system may also comprise a second apparatus comprising first receiving means for receiving the assigned network identity, wherein the network identity originates from the first network. The second apparatus may also comprise second providing means for providing the network identity to the second network. The system may also comprise a third apparatus comprising second receiving means for receiving the network identity. The second apparatus may be associated with the first network, and the third apparatus may correspond to a node of the second network.

BRIEF DESCRIPTION OF THE DRAWINGS

For proper understanding of the invention, reference should be made to the accompanying drawings, wherein:

FIG. 2(a) illustrates including Radio-Access Network (RAN) information within a pseudo-terminal identifier (PTID) in accordance with embodiments of the present invention.

DETAILED DESCRIPTION

Figure 1A:
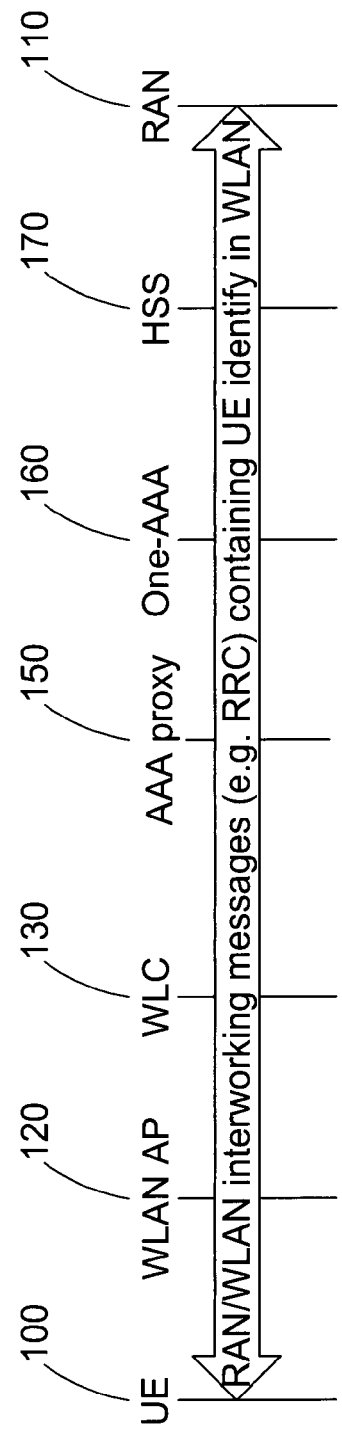
FIG. 1(a) illustrates RAN/WLAN messaging where a user equipment provides an identity, in accordance with an embodiment of the present invention.

Embodiments of the invention relate to an identity for user equipment that may be utilized in conjunction with heterogeneous networks. WLAN technology is becoming a radio-access-technology that serves mobile broadband users as other radio access technologies do. There are certain proposals to add items within 3GPP Release 13 which support LTE/WLAN carrier aggregation and dual connectivity. As such, 3GPP technologies and WLAN technologies may integrate more tightly on a radio level.

Certain embodiments of the present invention relate to the field of 3GPP and Wireless-Local-Area-Network (WLAN) interworking. 3GPP has standardized certain mobile-wireless-access technologies such as Long Term Evolution (LTE) and 3G, while WLAN mobile wireless access is based on technologies in accordance with IEEE standard 802.11-12, version 2012. Most of the current user equipment are equipped to utilize both 3GPP technology as well as WLAN technology. Specifically, most user equipment are equipped with at least one 3GPP Radio-Access-Technology (RAT) as well as a WLAN radio interface. WLAN access points may be user-deployed and may operate in an unlicensed spectrum. In contrast, current 3GPP base stations and UEs are typically owned by operators, and they typically use a licensed spectrum.

Recently, operators have started deploying WLAN Access Points (APs) as well as 3GPP base stations, and the operators are seeking to improve coordination between the WLAN and the 3GPP networks. Such operator-owned WLAN networks may be generally referred to as "carrier WLAN" networks, and the WLAN networks typically comprise WLAN APs as well as a WLAN access controller (AC). The WLAN access controller may provide a control-plane for the APs, and the WLAN access controller may act as a hub on the user-plane.

The term "radio-access network" (RAN) may refer to any 3GPP radio access network entity that performs radio resource control (RRC) functionality. In LTE, RRC functionality may be performed by an eNB node, while, in Wideband-Code-Division-Multiple-Access (WCDMA), RRC functionality may be performed by another RAN node (such as, for example, a Radio Network Controller (RNC)). RRC/Mobility Management (or radio resource control in general, without being limited to the existing RRC protocol) may also be performed by a centralized node, like a Multi-RAN Controller, depending on vendor specific implementation. The centralized node may also act as a controller to, for example, LTE, WLAN, and/or 3G. The term "WLAN" may refer to a Wireless-local-access-network unless otherwise stated.

When a user equipment (UE) seeks to move traffic that the UE communicates in a 3GPP network from the 3GPP network to a WLAN network, the 3GPP network may not be aware of the process. This process of moving traffic from the 3GPP network to the WLAN network may be referred to as "offloading." The term "onloading" may generally refer to the process corresponding to when the UE moves traffic from the WLAN network to the 3GPP network. When performing onloading, the 3GPP network may not be aware of the process of onloading. The 3GPP network may not be aware of the onloading because the UE identity utilized by the user equipment in the 3GPP network may be different/distinct compared to the same user equipment's UE identity that is utilized in the WLAN network. In a number of situations, the operator owning the 3GPP and the WLAN network may be interested in exercising control over the offloading process. However, the functionality for exercising such control is not provided by the currently-available tools.

Specifically, an operator may wish to have information relating to offloading decisions. One possible reason for the operator to want to know about offloading decisions may be so that the operator may address charging-related issues. Besides charging-related issues, another reason why the operator may want to know about offloading decisions is that the operator may want to direct the offloading to a WLAN that is configured to be dedicated to offloading. The WLAN may possibly not be available to non-offload WLAN traffic. Another reason why the operator may want to know about offloading is that the operator may want to maintain traffic statistics and may want to be aware about how much of the traffic has been offloaded and how successful the offloading is. Operators may wish to monitor a QoS (Quality of Service) and to enforce a certain service level. Another reason for the operator to want to know about offloading may be due to operator business policies. The operator may want to keep certain users/UEs in 3GPP network when 3GPP network has enough capacity to serve the UEs (thus redirecting UE accessing to WLAN back to 3GPP when certain criteria is fulfilled).

When WLAN is used for offload purposes and the operator wishes to retain control of the offload process, then it may be necessary to validate offload requests and to be able to identify offloaded traffic, for example, for charging purposes (for example, it may be possible that no charging is applied for the traffic if RAN makes the offload decision). The verification process may comprise performing of the actual verification itself, and the process may also comprise the routing of the information (to be verified) to the place where the actual verification takes place.

As described above, with the previous approaches, a UE may have separate identities in 3GPP and WLAN networks. Because of these separate entities, a cell (such as an LTE/WLAN picocell) is generally not able to discern if a same UE is active at the same time on both the LTE and the WLAN radios of the picocell. As such, with the previous approaches, coordination of the UE activities between the LTE and the WLAN is difficult.

Another shortcoming of the previous approaches relates to the difficulties of differentiating 3GPP RAN controlled offload from other types of WLAN usage in order to authorize RAN offload and to apply a proper charging model. Even though WLAN is using an unlicensed spectrum, WLAN usage may not be necessarily free of charge. RAN offload may be included into 3GPP-network charging fees, while other WLAN usage may be charged differently. In RAN-controlled offload, the user equipment may be using an identity based on Extensible-Authentication-Protocol-Method-for-GSM-Subscriber-Identity-Module/Authentication-and-Key-Agreement/Authentication-and-Key-Agreement-Prime (EAP-SIM/AKA/AKA-Prime).

When using the previous approaches, the user identity may be used for various WLAN networks. As such, the user identity may not be specific to RAN offload, and thus, with the previous approaches, it may not be possible to identify RAN offload by using only the user identity.

A user may also want to manually choose to use an identity based on EAP-SIM/AKA/AKA-Prime for detected WLANs. Further, it may be beneficial to be able to associate a user's identity in the WLAN network with the user's 3GPP identity in RAN for offload control.

With certain embodiments of the present invention, when a UE (with, for example, a Universal-Subscriber-Identity-Module (USIM) card) associates with either a 3GPP network or a WLAN network, and the UE performs USIM-based authentication, a network node (for example, a Home-Service-Subscriber (HSS)) may assign an identity (for example, a Heterogeneous Network (HetNet) identity) to the user/UE. A heterogeneous network identity may be an identity that is used in conjunction with different technologies, and/or different cell types, and/or different cell sizes. In certain embodiments, the network node may be the UE itself, a RAN node, and/or any Evolved-Packet-System (EPS) node. In certain embodiments, the identifier may be made available to the AAA that is serving the UE. An HSS may be the closest common point because the HSS may be involved in SIM authentication on both a 3GPP and a WLAN side. The HetNet user/UE identity may be stored in the HSS, and the HetNet user/UE identity may be provided from the HSS to the 3GPP and WLAN networks, and especially to RAN (to an eNB, a WLAN Controller/Access Controller, and/or a WLAN AP, for example), during authentication. Next, 3GPP and WLAN networks may exchange messages relating to the user/UE by using the HetNet user/UE identifier. Such messages may be related to, for example, the performing of coordinating UE network selection (for load balancing, QoS or for radio-quality based selection), the performing of LTE/WLAN carrier aggregation, and/or the performing of LTE/WLAN dual connectivity, for example. For example, in carrier aggregation, a WLAN network that receives messages from a UE may provide the messages together with a user/UE identity to a function that combines messages received over 3GPP and WLAN radios into meaningful IP packets and flows (without even requiring a 3GPP base station and a WLAN AP to be physically co-located on the same network element).

As 3GPP and WLAN networks may still use existing (temporary) identities (like an LTE Globally-Unique-Temporary-Identity (GUTI)) when operating on the radio, the operation of the networks is generally not dramatically changed when using embodiments of the present invention.

With respect to the HetNet user/UE identities/identifiers, in certain embodiments, the identity/identifier may be, for example, a 32 or a 64-bit value that may be allocated by the HSS when the user/UE associates with the 3GPP or the WLAN network after inactivity. In general, "after inactivity" may mean, for example, when the UE is just powered up and thus was not earlier associated with any of the networks, or when a UE becomes connected to 3GPP and WLAN networks at the same time. The HetNet user/UE identity may be released from the UE after the UE detaches from both the 3GPP and WLAN networks (such as, for example, during a powering down of the UE).

In certain embodiments of the present invention, as described above, the HSS delivers the identity/identifier to the 3GPP and the WLAN networks when the user/UE associates (attaches) to a network. The identity/identifier may be attached to a Radius (or Diameter) message, which allows an Authentication-Authorization-and-Accounting (AAA) server, a Wireless-LAN-Controller (WLC), a WLAN Access Point (AP), and/or other elements to learn the identity of the UE during WLAN hotspot authentication. For example, a new information element may be used in the Radius messages. The identifier may be attached to mobility management messages that may be exchanged between the UE and a Mobility-Management-Entity (MME), which allow, for example, an eNB to learn the identity of the UE during a user/UE authentication procedure. For example, a new information element may be used in the messages that may be exchanged by LTE network elements during the user/UE authentication process. Further, the identifier may be delivered to a Trusted-Wireless-Access-Gateway (TWAG), an Evolved-Packet-Data-Gateway (ePDG), a System-Architecture-Evolution-Gateway (SAE-GW), and/or to other user plane elements, if needed (by an eNB, a WLAN AP, and/or a WLAN Controller, for example). For example, the identifier may be delivered when establishing user plane connections, contexts, and/or bearers for a UE.

In certain embodiments, the HetNet user/UE identifier may not be communicated to the UE. The HetNet user/UE identifier may be kept inside 3GPP and WLAN network elements. However, as described in more detail below, in other embodiments, the HetNet user/UE identifier may be communicated to the UE.

In certain embodiments, the HetNet user/UE identity/identifier may be determined based upon, for example, an International-Mobile-Subscriber-Identity (IMSI) or an International-Mobile-Station-Equipment-Identity (IMEI) that is unique to the UE. The HetNet user/UE identity may not be exactly the same as the IMSI/IMEI. By forming the HetNet user/UE identity using IMSI or IMEI, there is generally no problem when the identity is released and reallocated to another user/UE.

In certain embodiments, a HetNet user/UE identity may be an IMSI. A WLAN network may determine the UE's IMSI during a WLAN hotspot authentication procedure. The UE may provide the IMSI to the eNB/Node B as a part of RRC communication for cell-reselection or during an initial attachment with the LTE/RAN network. As an option, the eNB may learn the UE IMSI from an EPC (Evolved Packet Core) element (like an MME) also as part of UE association with a cell (while performing, for example, a Tracking Area Update procedure). After the initial attachment with the LTE/RAN network, the eNBs exchange UE IMSI along with other data, such as profile data, for example.

In certain embodiments, a HetNet user/UE identity may correspond to a UE MAC address in WLAN. A Media-Access-Control (MAC) address may be unique to the UE, and the MAC address may be widely available in messages that are transferred between WLAN network elements. The WLAN network elements may comprise a WLAN AP, a WLAN Controller, and/or a AAA server, for example. The MAC address may be used to identify the UE (and thus identify the user at a given time). The UE may provide the UE's MAC address to the eNB/Node B using RRC messages.

In certain embodiments, a HetNet user/UE identity may correspond to a radius user name During WLAN hotspot authentication, the UE may identify itself to the AAA server in an EAP-Identity/Response message by providing a username@realm, for example, john.smith@mcc.mnc.3gpp.com. In this example, "John Smith" may be a username, and an MCC (mobile country code) and an MNC (mobile network code) may identify a country and a network operator, respectively. The UE may provide a used WLAN username@realm identity to RAN within a RRC message. The RAN and WLAN networks may exchange user/UE related messages by using the identity.

In certain embodiments, an AAA proxy may interface with RAN. From a functionality point of view, the AAA proxy may act locally as an AAA server having the ability to monitor authentication messaging between a UE and an AAA server and triggering RAN/WLAN interworking related actions as appropriate. The AAA proxy may be located in the OSS or WLC. The AAA proxy may be used to interface RAN and WLAN networks. In certain embodiments, a RAN/WLAN interworking messaging may guide UE RAN/WLAN selection. When the UE selects a WLAN AP, a further decision may be needed if the AP load is adequate, if a UE radio quality is adequate, and/or if WLAN is able to support ongoing service, for example. A new WLAN/RAN interworking interface may be specified in 3GPP, and the identity/identifier described above may be used in the signalling for the new WLAN/RAN interworking interface. The further decision may require communication between the WLAN network and RAN. This communication then may ensure good user experience and may avoid use of WLAN when the WLAN does not support good user experience. FIG. 1(a) illustrates RAN/WLAN messaging where a user equipment provides an identity, in accordance with an embodiment of the present invention. Referring to FIG. 1(a), UE 100 provides the identity to RAN 110. As UE 100 provides the identity to RAN 110, the identity may also be provided to other elements such as, for example, a WLAN Access Point 120, a Wireless LAN controller (WLC) 130, an AAA proxy 150, an AAA 160, and/or an HSS 170.

Figure 1B:
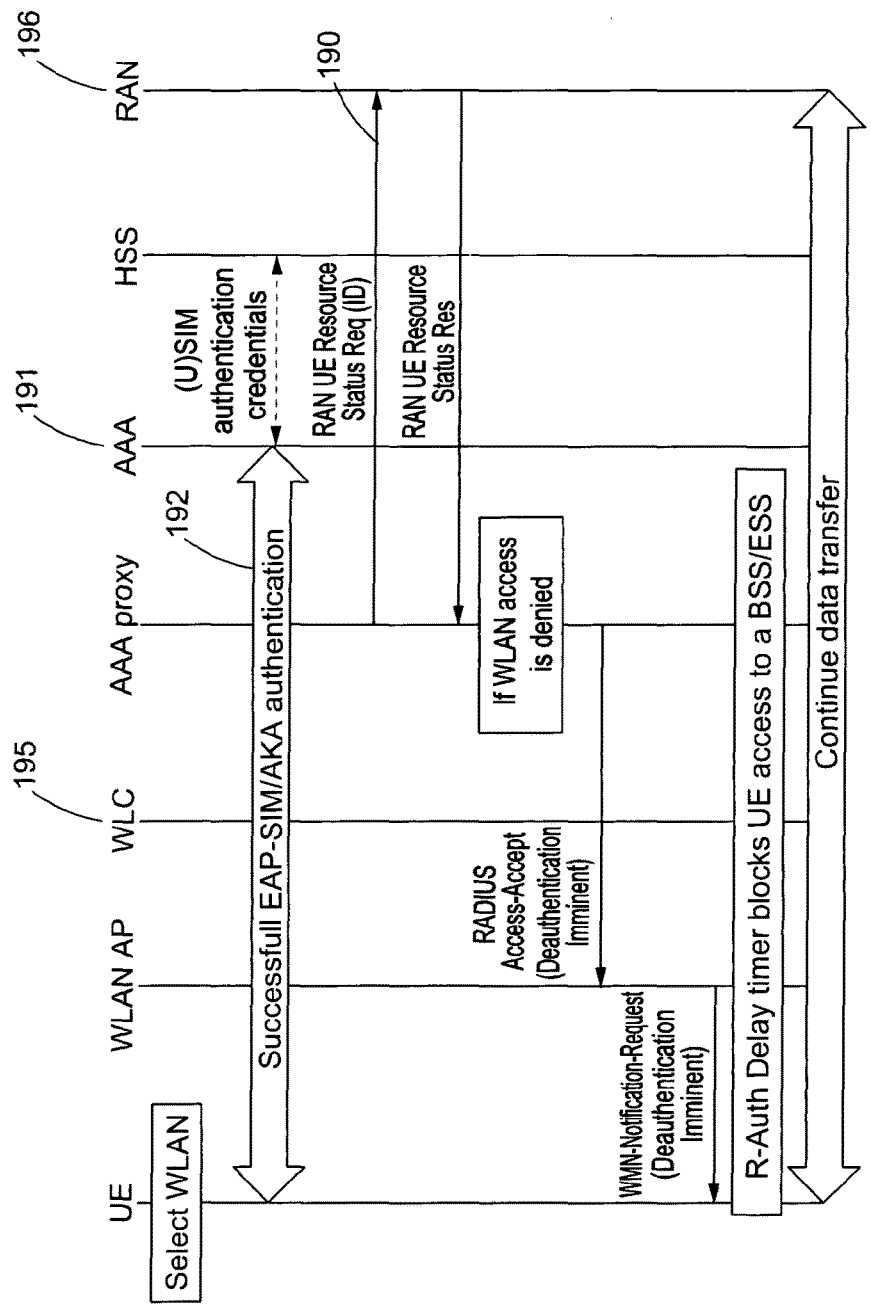
FIG. 1(b) illustrates RAN/WLAN messaging for determining if a user equipment should access WLAN, in accordance with an embodiment of the present invention.

FIG. 1(b) illustrates RAN/WLAN messaging for determining if a user equipment should access WLAN, in accordance with an embodiment of the present invention. There are alternative implementations of the embodiment illustrated by FIG. 1(b). A RAN UE Resource Status Request 190 may be transmitted from the AAA 191 itself. The RAN UE Resource Status Request 190 may be transmitted at any point during EAP authentication procedure. Preferably, the RAN UE Resource Status Request 190 may be transmitted as soon as a usable UE identity (like an IMSI, for example) is known. The RAN UE Resource Status Request 190 may be transmitted prior to any EAP authentication during a WLAN ASSOCIATION phase. At this point in time, it may be possible that only a UE MAC address is known, and thus the UE MAC Address may be used as a UE identity. Although FIG. 1(b) illustrates "Successful EAP-SIM/AKA authentication" 192, in certain embodiments, the authentication procedure may not be complete until the RADIUS Access-Accept message is sent. This message indicates successful EAP authentication. Also, WLC 195 or WLAN AP may directly transmit a RAN UE Resource Status Request query 190 to RAN 196 without AAA involvement.

In one example scenario, in accordance with certain embodiments of the present invention, the UE may decide to connect to a WLAN network, for example, as a result of following ANDSF policies or a RAN/WLAN Interworking procedure. A (U)SIM-based hotspot authentication may take place in the course of WLAN access. An AAA proxy may be aware of the user/UE identity, where the user/UE identity may correspond to a MAC address, or an IMSI, or an identity assigned by RAN. Therefore, the AAA proxy may inquire, of RAN, if the UE is allowed to access the WLAN network. The user/UE identity may have been provided to RAN (for example, the identity may be provided to a 3G RNC or an LTE eNB). Next, RAN may determine if UE WLAN access is allowed or denied for the UE. Because RAN is able to identify the user/UE, RAN may consider criteria corresponding to a QoS profile, a user profile etc, and/or other details in the course of making the determination. The RAN may consider more than just local load conditions. If UE WLAN access is allowed, the UE may begin transferring data over the WLAN network. Otherwise, if UE WLAN access is denied, the UE may continue data transfer using the 3G/LTE network. In general, if the RAN is not able to identify the user/UE, individual and optimal user/UE specific traffic steering decisions cannot be performed.

Figure 1C:
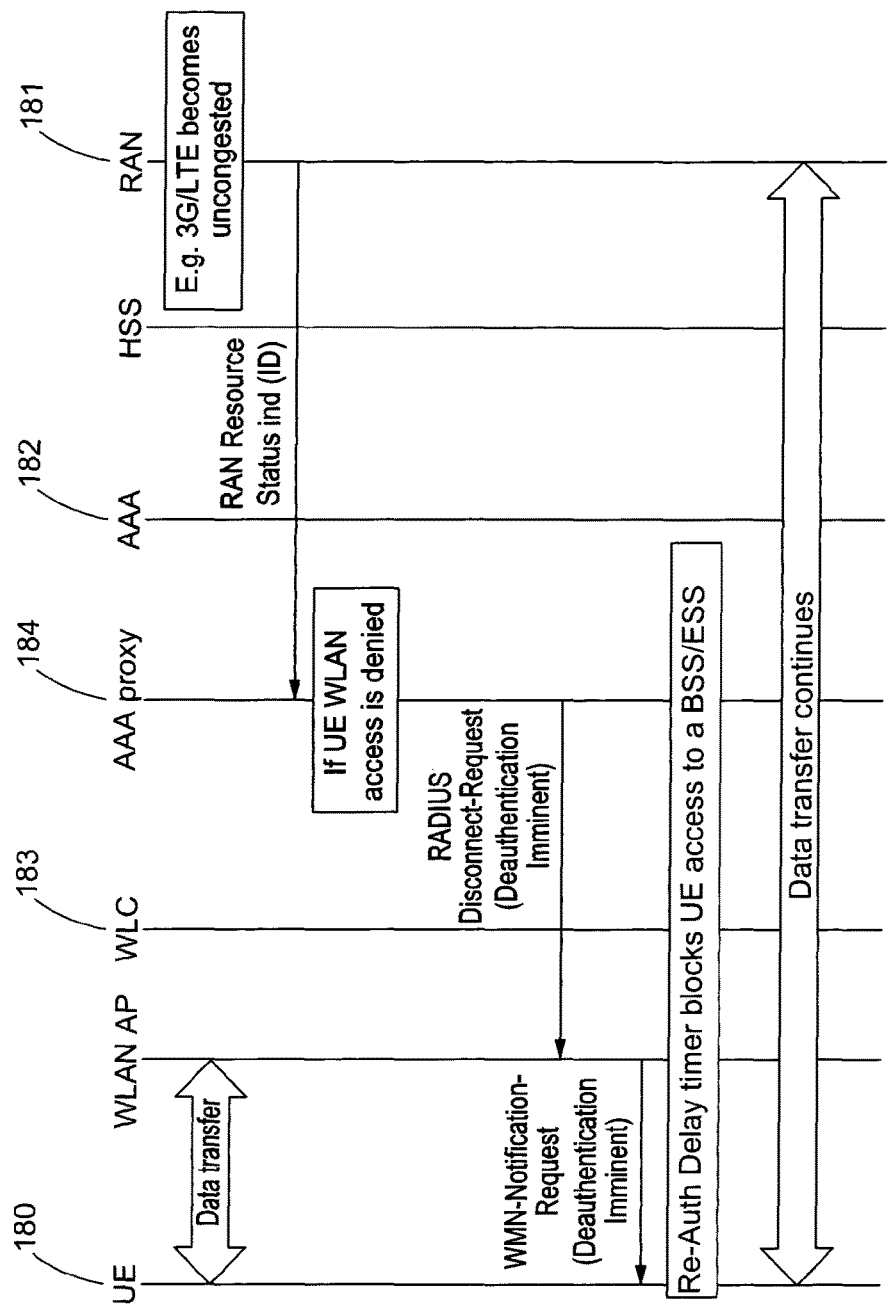
FIG. 1(c) illustrates RAN/WLAN messaging that is used when RAN requests that a user equipment be onloaded back to RAN, in accordance with an embodiment of the present invention.

FIG. 1(c) illustrates RAN/WLAN messaging that is used when RAN requests that a user equipment 180 be onloaded back to RAN 181, in accordance with an embodiment of the present invention. Similarly, if AAA 182 is bypassed, and RAN 181 and WLC 183 (or WLAN AP) are able to communicate directly, then RAN 181 may request disconnection from the Wireless-Lan Controller (WLC) 183. In one embodiment, a UE 180 may be using WLAN for data transfer. RAN 181 may request that the WLAN network transfer the UE 180 back from WLAN to RAN 181. For example, the RAN 181 may request that the UE 180 be transferred back to RAN 181 when previously-existing congestion on RAN 181 has since dissipated. RAN 181 may provide the user/UE identity to the AAA proxy 184. The AAA proxy 184 may be able to send a Disconnect Request message to the designated UE, or WLAN AP may use any WLAN specific other mechanisms to redirect UE back to RAN. The UE 180 may then be transferred to RAN 181, and the UE 180 may continue its data transfer via 3G/LTE RAN.

In certain embodiments, a HetNet user/UE identity may correspond to a temporary RAN identity (such as a GUTI, for example). When the UE communicates with the eNB, a temporary user identity may be established, allowing the RAN to uniquely identify the user. For example, the LTE may use a Globally Unique Temporary ID (GUTI). Besides GUTI, another identifier may be used as well. For example, the identifier may be any 8, 16, or 32-bit identifier that the RAN and the UE recognize, that RAN assigns to UE separately as part of RAN/WLAN interworking messaging. RAN may assign a temporary offload identifier which is provided to the UE using RRC signalling, for example. Depending on the format of the identifier, the UE may use the identifier either directly as a username in EAP signalling (as an outer username identity), or the identifier may be conveyed within EAP signalling between the UE and the AAA, allowing WLAN to eavesdrop the identifier from the signalling. The format of the identifier may be identifiable as a RAN offload username, for example, based on a used realm in the user name (e.g., PTID). When the UE connects to a WLAN hotspot and authentication begins, the UE provides the temporary RAN identity to the WLAN network. This providing of the temporary RAN identity may be performed, for example, by extending EAP frames that are exchanged between the UE and the AAA server. The WLAN AP and the WLAN Controller/Access Controller may read the identifier from messages that are transmitted towards the AAA server. As an option, LTE-assigned GUTI may contain an eNB-specific prefix/postfix in addition to a user/UE-specific ID. The prefix/postfix may contain a cell ID and/or, an eNB ID information and/or other information identifying the eNB serving the UE. When UE accesses WLAN, UE provides GUTI to the WLAN network. In case eNB uses eNB-specific prefix/postfix as part of GUTI assignment, the WLAN network may use the prefix/postfix part to identify the eNB serving the UE in LTE (for example, using pre-configuration or DNS query). This enables the WLAN network to dynamically initiate communication with the correct eNB and coordinate UE WLAN access. As a result, the eNB learns WLAN address information to be able to communicate with WLAN, if needed (e.g. onload UE back to RAN).

After establishing a common user/UE identifier in the 3GPP and WLAN networks, the 3GPP and WLAN networks may start coordinating activities related to the user/UE by using the identity. For example, the UE may have an ongoing bearer in an LTE picocell, and the UE may, at the same time, associate with a WLAN AP (of the same picocell). Now, an eNB RRM (Radio Resource Manager) and WLAN RRM may start coordinating activities related to the user/UE. For example, the eNB RRM and the WLAN RRM may start coordinating when the UE's network traffic should be redirected from LTE to WLAN (via remaining connections/bearers) or vice versa. As another example, the UE may have an ongoing bearer in WLAN, where the WLAN AP is located within the LTE/WLAN picocell. The LTE RRM may decide to enable Carrier-Aggregation/dual connectivity (CA/dual connectivity) for the UE, and thus enable radio resource allocations on the LTE side and start to coordinate UE operation on both LTE and WLAN radios. As another example, the UE may be connected to an LTE macrocell and, at the same time, be connected to a WLAN hotspot. The WLAN network may ask the LTE macrocell if the UE WLAN access should be allowed or denied, and the macro eNB may apply various criteria during the decision-making process (where the criteria may be based on a user profile, a Quality-of-Service (QoS) profile, and/or a load, for example).

In case the user/UE identity is not created using IMSI and/or IMEI (and is not created using any other fixed user/UE specific identity like MSISDN, SIP address, etc.), the identity may need to be released and reused at some point in time. With respect to releasing of an identity, when the UE disconnects from the 3GPP network, the HSS may check to determine if the user/UE is active in WLAN, and the HSS may release the identity if the user/UE is not active. When the UE disconnects from a WLAN hotspot, charging may be stopped, which causes the WLAN AP to send a message to, for example, the AAA server. The AAA server may send a notification to the HSS, which allows the HSS to know that the UE is no longer active on WLAN. The user identity may be released when a UE becomes inactive in either 3GPP or WLAN network, or when a UE becomes inactive in both 3GPP and WLAN networks.

In certain embodiments of the present invention, the HetNet user/UE identity may correspond to a temporary offload ID. The UE may be provided, by the RAN, with the temporary offload ID (such as a PTID, for example) during the connection establishment with the 3GPP RAN. Optionally, the PTID (pseudo-terminal identifier) may be provided later, while the UE is already connected to RAN. The PTID may be constructed in a way which allows the WLAN to identify the PTID as a RAN-offload ID. The PTID may also contain RAN routing information (such as, for example, the serving RAN node address, like an eNB ID or a Radio-Network-Controller (RNC) ID).

In certain embodiments of the present invention, the PTID may be used as an outer user identity in the EAP signaling when the UE connects to the WLAN, in order to execute a RAN-offload decision. The inner identity (such as an EAP SIM/AKA/AKA-Prime identity, for example) may be only exchanged between the UE and the AAA server. The Outer identity may be the User-Name attribute in the RADIUS message. The RADIUS message may be exchanged between the WLAN AP and the AAA server. The UE communicates with the AAA server using EAP messages. The UE exchanges EAP messages with the WLAN AP, and the AP conveys the EAP messages further to AAA within RADIUS messages in an EAPMessage Attribute. In certain embodiments, the only requirement for the RADIUS User-Name, in practice, may be that the RADIUS User-Name be routable to the home AAA server; the RADIUS User-Name should have proper realm. The AAA does not necessarily know the User-Name value (it can be anonymous), but then the AAA may explicitly request EAP Identity from the UE to get full user identity (to get an actual credential like a EAP-AKA identity, for example). The RADIUS User-Name identity may be initially requested by the AP from the UE; this request may trigger EAP authentication in the UE. This EAP identity may be an inner user identity (but the EAP identity may possibly not be carried in every EAP message, just once per session).

In certain embodiments of the present invention, the WLAN recognizes that the PTID matches a RAN-offload ID format and may extract RAN addressing information from the PTID.

In certain embodiments of the present invention, as described above, the WLAN contacts the RAN to verify that the UE (to verify that the UE corresponding to the PTID) is authorized to offload traffic to the WLAN. Any further communication between the WLAN and the RAN that is related to this WLAN session may utilize the PTID.

In one embodiment of the present invention, the WLAN may be provided with a set of offload IDs by the RAN. Then, the WLAN may verify an offload ID provided by a UE against the set of offload IDs that may be provided by the RAN. The offload IDs may be used as one-time use tokens, where each ID is applicable for allowing one offloading. When the WLAN is able to verify the ID itself, the ID does not necessarily need to contain RAN routing information.

In one embodiment of the present invention, when the WLAN inquires of the RAN regarding whether the UE's bearer is permitted to be offloaded, the WLAN may also provide the Access Point Name (APN) of the bearer to the RAN. This providing of the APN may aid the RAN in determining whether a particular service has to be retained in the RAN (the service may be an Internet-Protocol-Multimedia-Subsystem (IMS) call, for example) or whether the service may be offloaded to WLAN. As such, certain embodiments of the present invention may support bearer-specific offload. For example, a UE may have an IMS call in LTE, and Public-Safety services may be offloaded to WLAN based on the APN.

As described above, 3G and LTE may let RAN assign a temporary user ID (as the HetNet identifier/identity) for the UE via RRC messages. The temporary user ID may be assigned during RRC connection establishment between the UE and the RAN, or when the RAN establishes the knowledge that interworking with WLAN should be applied for the user/UE. This temporary user ID may correspond to the above-described PTID. The PTID may be based on a pseudorandom number. If the UE performs RAN-controlled offload, the UE would use this PTID as a username (an outer user identity) in the initial EAP identity message exchange between the UE and the WLAN AP. The temporary user ID may also be GUTI without eNB-specific prefix/postfix/identifier information.

Alternatively, the RAN may provide only a distinguishing part (such as a Terminal Identifier (TID), for example) of the whole username (of a whole PTID, for example) or may provide a complete PTID. The UE may locally create a PTID that is based upon the TID and a pre-defined formula based on a home Public-land-mobile-network (PLMN). The PTID may be based upon TID and, for example, a formula: 7<TID>@<3GPPREALM>. The "7" may be added to differentiate this identity from EAP-SIM/AKA/AKA-PRIME identities, as these other identities use leading digits between 0-6. <3GPPREALM> is either a same realm that is used in EAP-SIM/AKA (wlan.mnc<MNC>.mcc<MCC>0.3gppnetwork.org) or a dedicated RAN offload realm (like offload.mnc<MNC>.mcc<MCC>0.3gppnetwork.org). Both options allow the WLAN to identify the username as a RAN offload identity. A used realm may need to be able to identify a home operator (such as a Home-Public-Land-Mobile- Network (HPLMN), for example). The home operator may be used to route the WLAN authentication messages to a home AAA server.

The TID component may also comprise RAN addressing information to help the WLAN to access a correct RAN node when the WLAN performs the process of offload-authorization checking. The RAN addressing information may be a part of a structure that comprises any number of means such as, for example, a special separator between a pseudorandom sub-component and the RAN addressing information. The pseudorandom component should be long enough to prevent forgery of the pseudorandom component. The RAN addressing information may contain some RRC identifier component like an eNB ID, or a Radio-Network-Controller (RNC) ID, or some other cell-identifier derivative, or even a domain ID for a Domain-Name-System (DNS) resolution, or an IP address directly. This RRC identifier component may allow identification of an allocating entity, and may also help in addressing the allocating entity from WLAN.

In certain embodiments of the present invention, the UE constructs PTID (e.g., an MSISDN, SIP address, randomized number with UE-specific details) and provides the identifier to both RAN and WLAN when associated/connected to the networks. PTID may contain components (or may be the same as) of a unique user identity (used as part of authentication), may contain components of GUTI, or may be, for example, randomized.

FIG. 2(a) illustrates including Radio-Access Network (RAN) information within a pseudo-terminal identifier (PTID) in accordance with embodiments of the present invention. The offload requested/ok message may be transmitted after the WLAN association is formed, when EAP authentication starts. In certain embodiments of the present invention, if the RAN 200 orders offloading, the UE 201 will use the PTID (provided by the RAN 200) as an identity to access the WLAN 202. Using the PTID to access the WLAN 202 may be described as using the PTID as an outer user identity. The WLAN 202 will deduce the RAN information from the PTID, and the WLAN 202 may check (from the RAN 200) whether the request is legitimate and thereby authorized. The WLAN 202 may also provide APN information of the UE's bearer to RAN 200, which enables the RAN 200 to decide whether to permit a bearer offload or whether to retain the service in RAN 200. 3GPP is currently specifying a use of S2a-Mobility-using-GTP (SAMOG) which allows the UE 201 to deliver the APN to the WLAN 202 using a new WLAN-Control-Protocol (WLCP). A RAN offload decision that is specific to an Access-Point-Name (APN) may be validated during the WLAN control protocol (WLCP) connection setup too, as soon as the APN is known to the WLAN 202. Alternatively, the APN information may be sent to the WLAN 202 by embedding the APN information into the PTID by the UE 201.

In certain embodiments of the present invention, an authentication request from the UE will then be forwarded to the AAA server based on the used realm in the identity. The AAA may not know this PTID, but the AAA may explicitly inquire the proper EAP-SIM/AKA identity from the UE. The AAA may inquire the identity using an EAP-Identity Request message (such an inquiry is in accordance with the current standards when an anonymous identification is used). Such an inquiry allows the AAA to properly authenticate the user. The WLAN AP may continue to use an original PTID in Radius messages as an outer user identity in all AAA communication. In certain embodiments, the IMSI may possibly not be revealed to any party of the communication, and the IMSI may not be required by any party. The RAN and WLAN network may communicate using this PTID identity as UE identification.

Certain embodiments of the present invention may enable an operator to explicitly authorize RAN offload attempts and to prevent illegal WLAN usage. The UE may not be able to manually select an operator WLAN which is reserved for RAN offloading. When PTID 15 used, the operator WLAN network may confirm from the RAN whether or not the access is really authorized by RAN.

Certain embodiments of the present invention may allow an operator to apply a RAN-offload-specific-charging model for WLAN usage, as the operator is able to identify use of RAN offload based on the PTID. If the UE enters the WLAN using a regular EAP-SIM/AKA identity, then the operator may identify this identity and use a different charging model for the access. The RAN offload is presumably free of charge for the user because RAN orders the offload. Certain embodiments of the present invention may be compatible with existing WLAN specifications. A WLAN radio interface may not need to be modified at all to use embodiments of the present invention. The WLAN radio interface may not require new 3GPP interfaces either. Depending on the deployment mode, the WLAN radio interface may only require new additional attributes or provide signaling into RRC messaging to deliver the PTID or other form of offload user identifiers and to interface between the RAN and the WLAN for authorization check. The interface may be avoided if ANR is deployed or if PTID offload identifiers are pre-distributed by other means to WLAN (because WLAN may be able to recognize valid PTIDs). In one embodiment, the PTID identifiers may be preferably used one-time or may be used as short-living identifiers.

The IMSI may not be required at any point in the procedure. A PTID's RAN information component may allow a WLAN controller to find a correct RAN.

One possible difficulty when using embodiments of the present invention relates to the handling of Denial-of-Service (DoS) attacks. During such an attack, the UE may generate bogus 7<PTID>@<3GPPREALM> identities to overload the RAN/WLAN interface. According to embodiments of the present invention, the WLAN may black list the UE MAC due to failed RAN authorization. As such, handling DoS may not be an issue for embodiments of the present invention.

According to the previous approaches, there does not exist any clear Access-Network-Discovery-and-Selection-Function (ANDSF) charging model. The charging model may be free or there may be a cost associated to WLAN usage. According to the previous approaches, there is generally no good method to differentiate manual WLAN access from the ANDSF controller WLAN access, and the lack of such a method may be a problem from a charging perspective. The charging entity may need to know UE ANDSF policy in order to determine when WLAN access is charged under an ANDSF agreement, or whether the WLAN access is charged under some other agreement, or whether access is to be completely denied.

The distribution of the PTID to the UE, by the eNB, may be interpreted as "offload credits." The WLAN may assume that the UE may offload, solely based on the fact that the UE is in possession of the PTID. However, the UE's offload credits do not necessarily preclude the WLAN from further checking with the eNB regarding whether offload is appropriate.

In certain embodiments of the present invention, there may be a new network entity that allocates PTIDs for RAN nodes. This entity may be used by the WLAN to authorize WLAN access for RAN offload. Using this entity may simplify security issues related to authorization checks because WLAN may only need a single connection to 3GPP. In all scenarios, the WLAN should be able to validate a used PTID to avoid illegal use of the PTID. The PTID may be associated with an expiration timer. The timer may have a value relating to a variance of network traffic over time, or with the average stay of time of a UE in the RAN coverage.

PTIDs may be also marked as "expired" by dedicated signaling between RAN and AC.

Figure 2B:
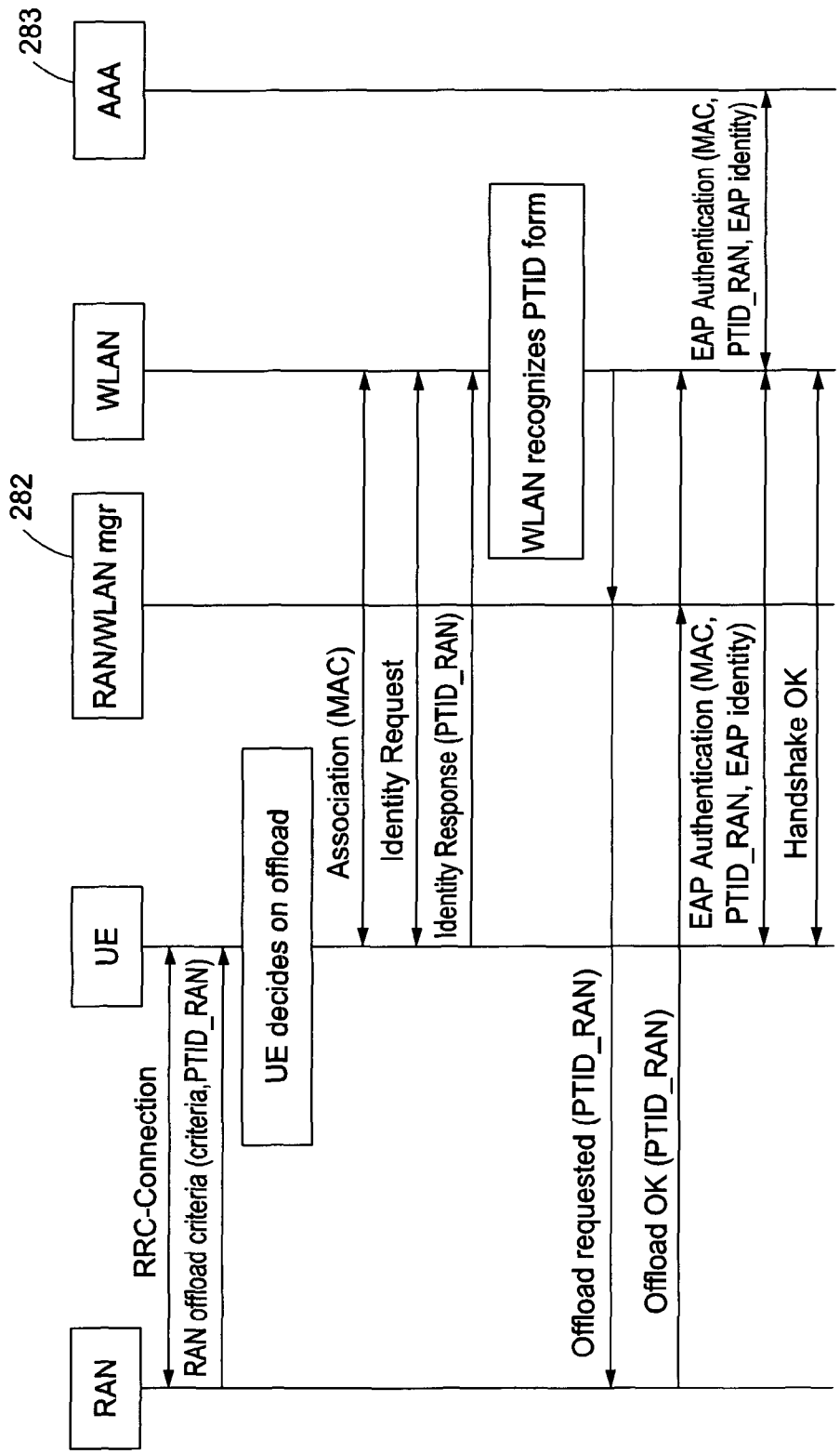
FIG. 2(b) illustrates including RAN information within a PTID in accordance with another embodiment of the present invention.

FIG. 2(b) illustrates including RAN information within a PTID in accordance with another embodiment of the present invention. FIG. 2(b) illustrates an option where offload validation is performed by another entity (such as RAN/WLAN manager 282) that may be aware of WLAN and RAN identities and locations. FIG. 2(b) illustrates a new entity RAN/WLAN manager 282 for routing offload messages between WLAN and RAN. It may be impractical to keep consistent network mappings in all the WLANs and RAN nodes. A broker node like WLAN/RAN manager 282 may be more easily maintained and may be easily added to WLAN and RAN configurations. On network topology changes only broken may need to be modified.

Figure 3:
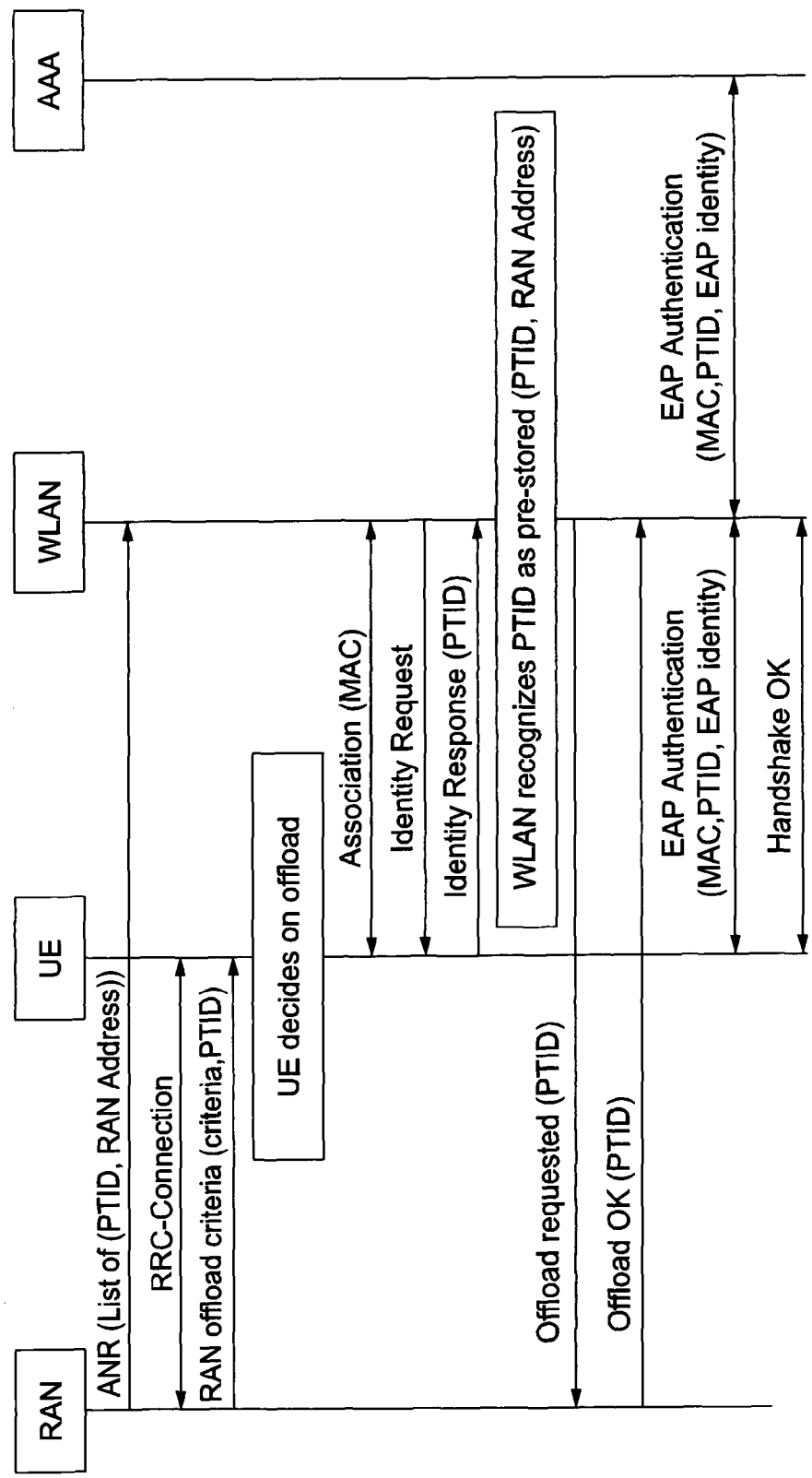
FIG. 3 illustrates using predistributed one time tokens, when RAN is still granting an offload request in accordance with an embodiment of the present invention.

In certain embodiments of the present invention, one agent such as, for example, an Access Controller (AC), or the RAN, or an intermediate agent, may distribute a list of tokens. Then, an AC (or a WLC or a WLAN node) may perform fast verification of an offload attempt, as shown in FIG. 3. The AC (or WLC or AP) may perform the fast verification by checking the one time token that it receives from the UE against the list of one time tokens that it received earlier from RAN. By virtue of the UE possessing a valid token, the AC (or WLC or AP) may assume offload is granted and skip steps "offload requested" in FIG. 3. This operation becomes straight forward as RAN has established ANR, that is, it is known which APs are under full coverage of which eNBs. It is also conceivable for no-ANR enabled networks, however, it may require larger one time token lists and a less efficient use of those.

FIG. 3 illustrates using predistributed one time tokens, when RAN is still granting an offload request.

Figure 4:
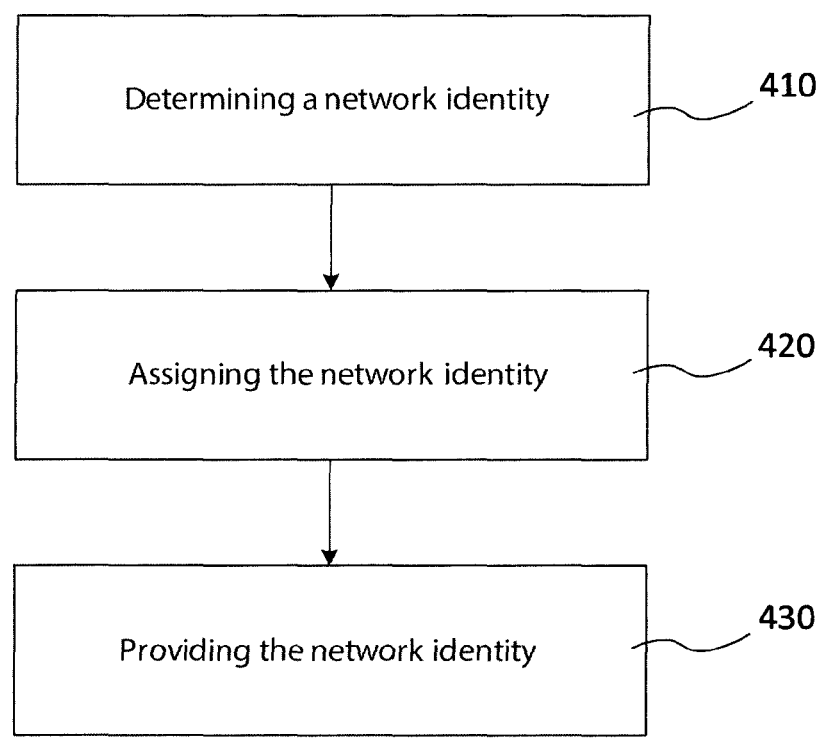
FIG. 4 illustrates a flowchart of a method in accordance with embodiments of the invention.

FIG. 4 illustrates a logic flow diagram of a method according to certain embodiments of the invention. The method illustrated in FIG. 4 may comprise, at 410, determining, by a network node of a first network, a network identity that is valid for the first network and a second network. The method may also comprise, at 420, assigning the network identity to a user equipment. The method may also comprise, at 430, providing the network identity to at least one node of the second network and the user equipment. The first network and the second network may be based on different technologies.

Figure 5:
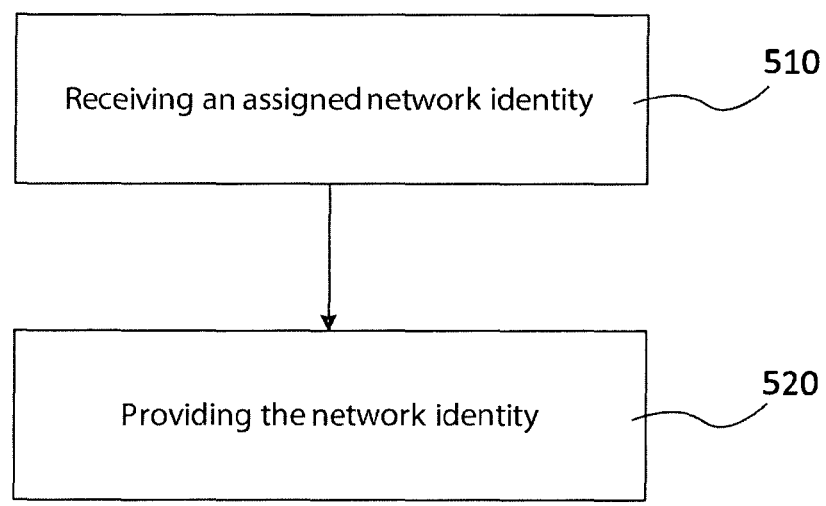
FIG. 5 illustrates a flowchart of another method in accordance with embodiments of the invention.

FIG. 5 illustrates a logic flow diagram of a method according to certain embodiments of the invention. The method illustrated in FIG. 5 may comprise, at 510, receiving, by a user equipment, an assigned network identity. The network identity originates from a first network and is valid for the first network and a second network. The presence of such identity may be a pre-requisite or even a trigger for offload decision. If RAN provides the identifier only when a device is expected to offload, then the decision is done by RAN. Offloading itself happens in the UE and may be affected by many different factors. The first network and the second network may be based on different technologies. The method may also comprise, at 520, providing, by the user equipment, the network identity to the second network.

Figure 6:
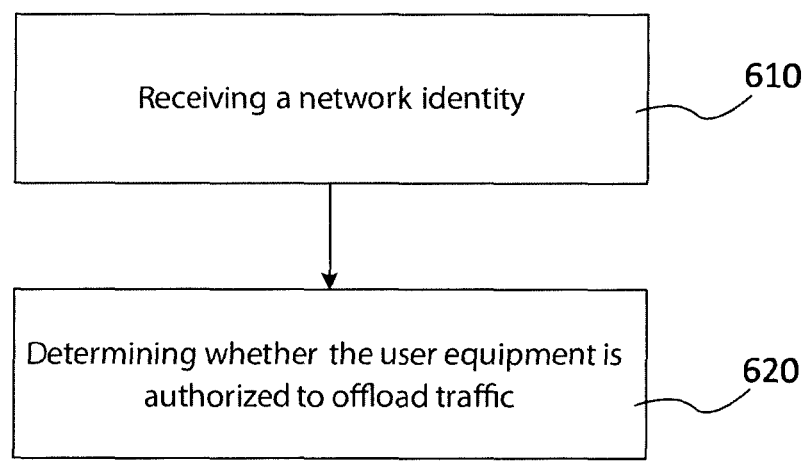
FIG. 6 illustrates a flowchart of another method in accordance with embodiments of the invention.

FIG. 6 illustrates a logic flow diagram of a method according to certain embodiments of the invention. The method illustrated in FIG. 6 may comprise, at 610, receiving, by a network node, a network identity. A user equipment is associated with a first network. The network node corresponds to a node of a second network. The user identity is valid for the first network and the second network. The first network and the second network may be based on different technologies. The method also comprises, at 620, determining whether the user equipment is authorized to offload traffic from the first network to the second network.

Figure 7:
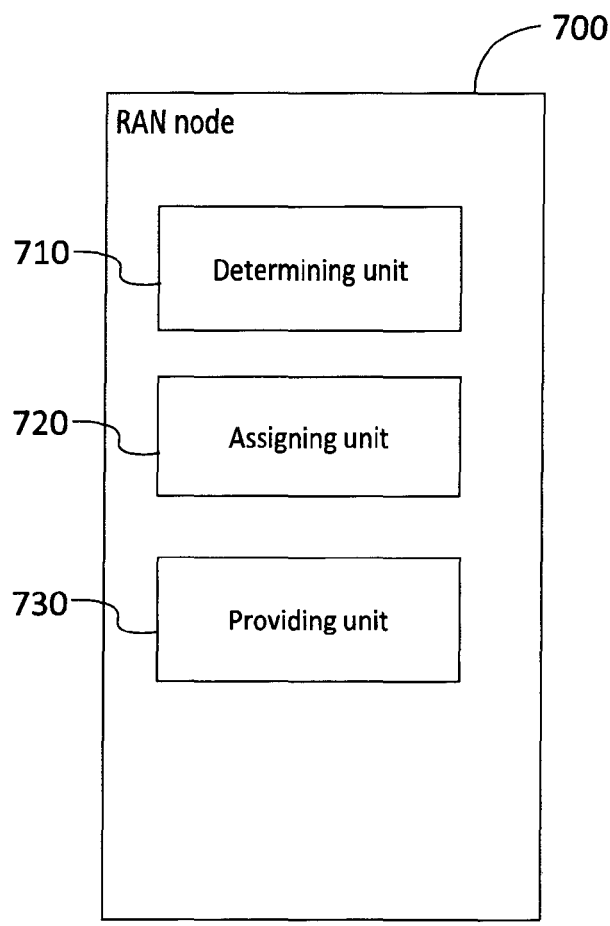
FIG. 7 illustrates an apparatus in accordance with embodiments of the invention.

FIG. 7 illustrates an apparatus in accordance with one embodiment. Apparatus 700 may comprise a determining unit 710 that determines a network identity that is valid for the first network and a second network. Apparatus 700 may also comprise an assigning unit 720 that assigns the network identity to a user equipment. Apparatus 700 may also comprise a providing unit 730 that provides the network identity to at least one node of the second network and the user equipment. The first network and the second network may be based on different technologies.

Figure 8:
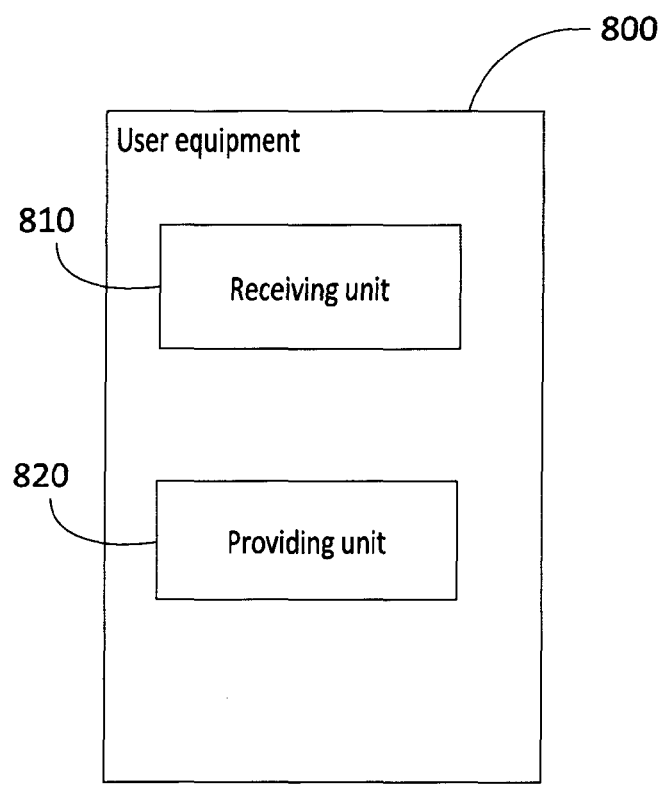
FIG. 8 illustrates an apparatus in accordance with embodiments of the invention.

FIG. 8 illustrates an apparatus in accordance with one embodiment. Apparatus 800 may comprise a receiving unit 810 that receives an assigned network identity. The network identity originates from a first network and is valid for the first network and a second network. The first network and the second network may be based on different technologies. Apparatus 800 may also comprise a providing unit 820 that provides the network identity to the second network.

Figure 9:
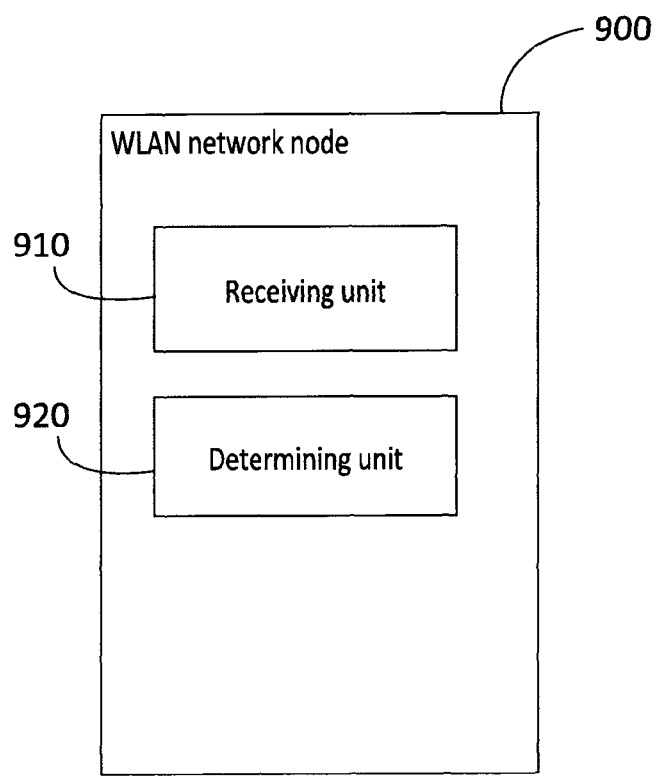
FIG. 9 illustrates an apparatus in accordance with embodiments of the invention.

FIG. 9 illustrates an apparatus in accordance with one embodiment. The apparatus 900 may comprise a receiving unit 910 that receives a network identity. A user equipment is associated with a first network, and the apparatus 900 corresponds to a node of a second network. The user identity is valid for the first network and the second network. The first network and the second network may be based on different technologies. The apparatus 900 may also comprise a determining unit 920 that determines whether the user equipment is authorized to offload traffic from the first network to the second network.

Figure 10:
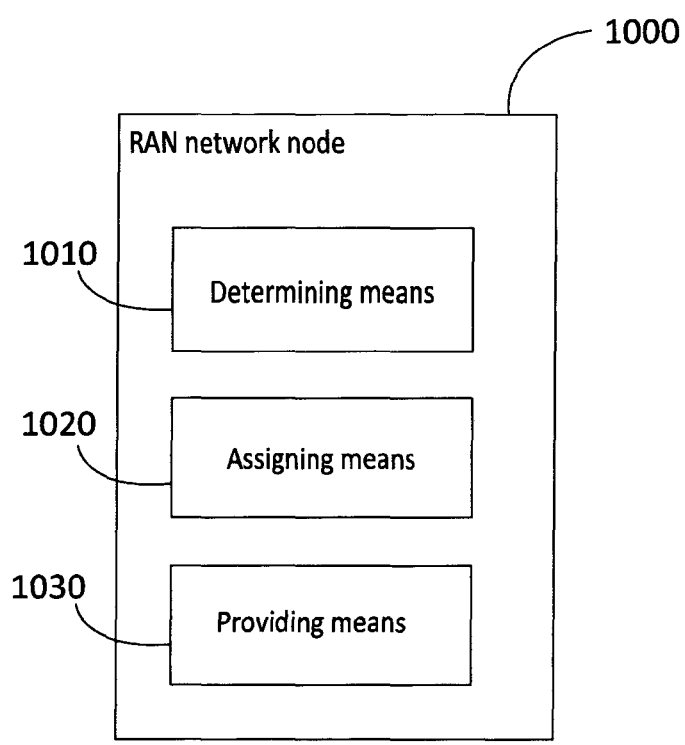
FIG. 10 illustrates an apparatus in accordance with embodiments of the invention.

FIG. 10 illustrates an apparatus in accordance with one embodiment. A heterogeneous identity may also be assigned by other entities such as a HSS/AAA. In this case, the heterogeneous identity may be provided to the RAN as an extension to existing Radio-Access Bearer (RAB) management messages in a RAN/Core network interface. The same identity may be provided to the WLAN during a WLAN authentication phase within RADIUS messaging. This identity may be exchanged between WLAN and RAN to allow RAN to associate the RAN UE Resource Status Request/Offload request message to the user on a RAN side. The apparatus 1000 may comprise determining means 1010 for determining a network identity that is valid for the first network and a second network. The apparatus 1000 may also comprise assigning means 1020 for assigning the network identity to a user equipment. The apparatus 1000 may also comprise providing means 1030 for providing the network identity to at least one node of the second network and a user equipment. The first network and the second network may be based on different technologies.

Figure 11:
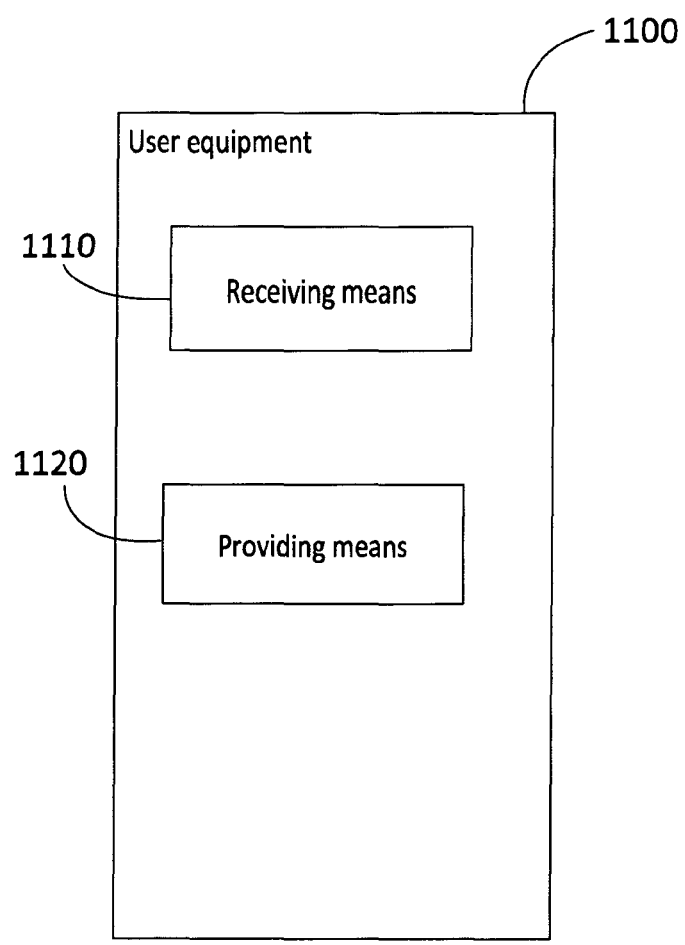
FIG. 11 illustrates an apparatus in accordance with embodiments of the invention.

FIG. 11 illustrates an apparatus in accordance with one embodiment. Apparatus 1100 may comprise a receiving means 1110 for receiving an assigned network identity. The network identity originates from a first network and is valid for the first network and a second network. The first network and the second network may be based on different technologies. Apparatus 1100 may also comprise providing means 1120 for providing the network identity to the second network.

Figure 12:
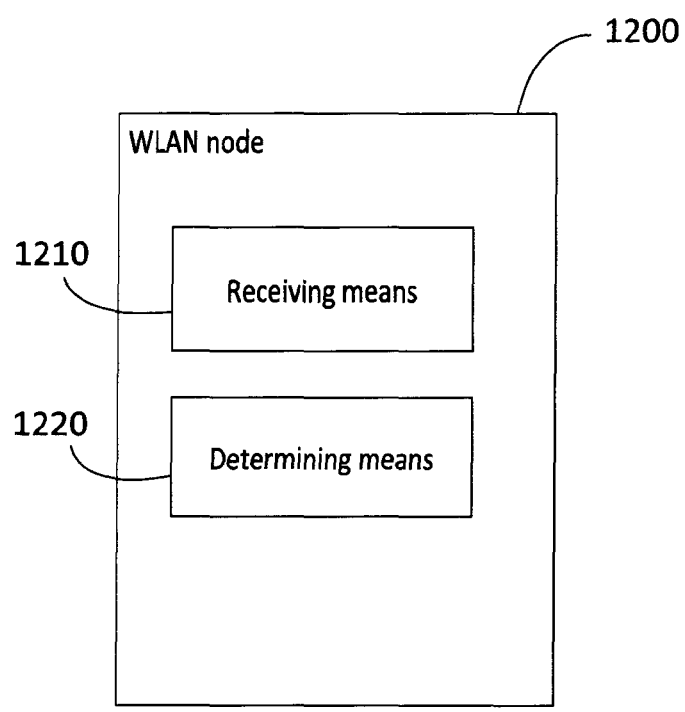
FIG. 12 illustrates an apparatus in accordance with embodiments of the invention.

FIG. 12 illustrates an apparatus in accordance with one embodiment. In certain embodiments, apparatus 1200 may be a WLAN node. However, in other embodiments, apparatus 1200 may be an AAA proxy or an AAA, for example. Apparatus 1200 may comprise a receiving means 1210 for receiving a network identity. A user equipment is associated with a first network. Apparatus 1200 corresponds to a node of a second network. The user identity is valid for the first network and the second network. The first network and the second network may be based on different technologies. Apparatus 1200 may also comprise determining means 1220 for determining whether the user equipment is authorized to offload traffic from the first network to the second network.

Figure 13:
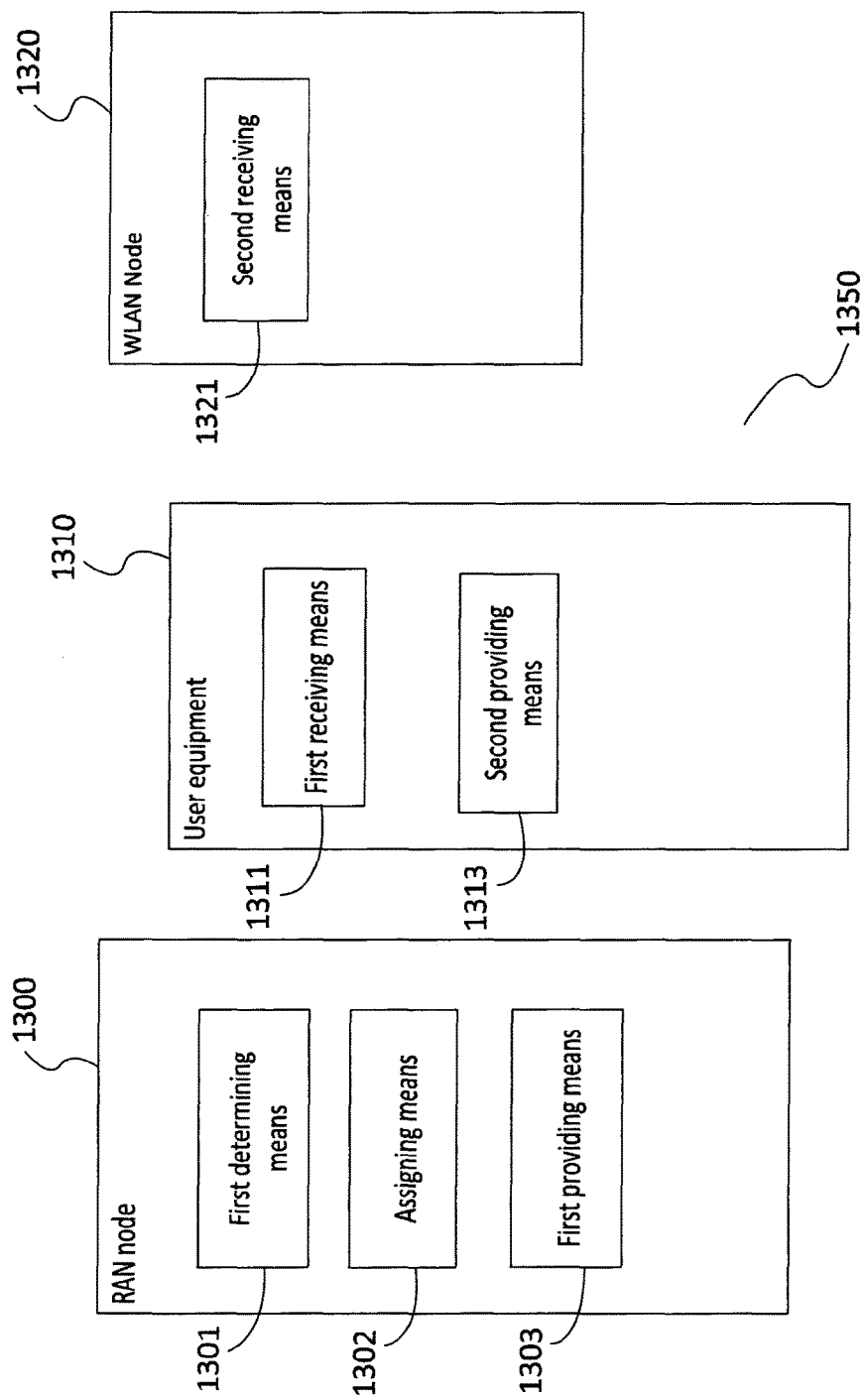
FIG. 13 illustrates a system in accordance with embodiments of the invention.

FIG. 13 illustrates a system in accordance with one embodiment. System 1350 may comprise a first apparatus 1300. First apparatus 1300 may comprise a first determining means 1301 for determining a network identity that is valid for the first network and a second network. First apparatus 1300 may also comprise assigning means 1302 for assigning the network identity to a second apparatus. First apparatus 1300 may also comprise first providing means 1303 for providing the network identity to at least one node of the second network and the second apparatus. The first network and the second network may be based on different technologies. System 1350 may also comprise a second apparatus 1310. Second apparatus 1310 comprises first receiving means 1311 for receiving the assigned network identity. The network identity originates from the first network. Second apparatus 1310 may also comprise second providing means 1313 for providing the network identity to the second network. System 1350 may also comprise a third apparatus 1320 that comprises second receiving means 1321 for receiving the network identity. The second apparatus 1310 is associated with the first network, and the third apparatus 1320 corresponds to a node of the second network.

Figure 14:
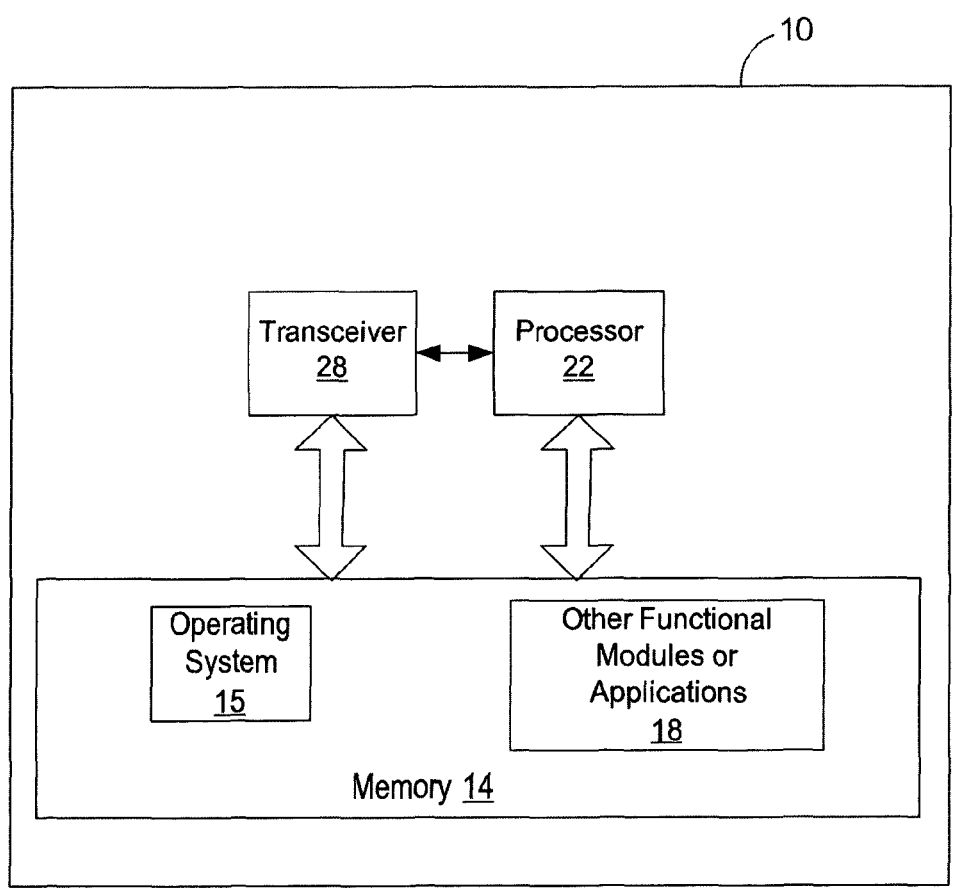
FIG. 14 illustrates an apparatus in accordance with embodiments of the invention.

FIG. 14 illustrates an apparatus 10 according to embodiments of the invention. Apparatus 10 may be a device, such as a UE, for example. In other embodiments, apparatus 10 may be a base station, access point, and/or any other network node, for example, within a WLAN or a RAN. Apparatus 10 may also comprise a network node that performs the function of a trace collection entity, for example.

Apparatus 10 may comprise a processor 22 for processing information and executing instructions or operations. Processor 22 may be any type of general or specific purpose processor. While a single processor 22 is shown in FIG. 14, multiple processors may be utilized according to other embodiments. Processor 22 may also comprise one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further comprise a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 may be comprised of any combination of random access memory (RAM), read only memory (ROM), static storage such as a magnetic or optical disk, or any other type of non-transitory machine or computer readable media. The instructions stored in memory 14 may comprise program instructions or computer program code that, when executed by processor 22, enable the apparatus 10 to perform tasks as described herein.

Apparatus 10 may also comprise one or more antennas (not shown) for transmitting and receiving signals and/or data to and from apparatus 10. Apparatus 10 may further comprise a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 comprising, without limitation, precoding of antenna gain/phase parameters, encoding and decoding of individual bits forming a communication message, formatting of information, and overall control of the apparatus 10, comprising processes related to management of communication resources.

In certain embodiments, memory 14 stores software modules that provide functionality when executed by processor 22. The modules may comprise an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
  determining, by a network node of a first network, a network identity that is valid for the first network and a second network;
  assigning the network identity to a user equipment, wherein the network identity is configured to identify the network identity as corresponding to a temporary offload identifier for authorizing offloading; and
  providing the network identity to at least one node of the second network and the user equipment, wherein the first network and the second network are based on different technologies.

2. The method according to claim 1, wherein the first network corresponds to a Radio-Access-Network, and the second network corresponds to a Wireless-Local- Area-Network.

3. The method according to claim 1, wherein the assigning the network identity to the user equipment comprises assigning the identity when the user equipment associates with the first network or the second network after inactivity.

4. The method according to claim 1, further comprising releasing the network identity from the user equipment after the user equipment detaches from the first network and the second network.

5. The method according to claim 1, wherein the network identity is configured in a way that it can be identified by the second network or the user equipment.

6. The method according to claim 1, wherein the network identity comprises routing information.

7. An apparatus, comprising:
  at least one processor,
  and at least one non-transitory memory including computer program code,
  the at least one non-transitory memory and the computer program code configured to, with the at least one processor, cause the apparatus at least to perform:
  determine a network identity that is valid for a first network and a second network;
  assign the network identity to a user equipment; wherein the network identity is configured to identify the network identity as corresponding to a temporary offload identifier for authorizing offloading; and
  provide the network identity to at least one node of the second network and the user equipment, wherein the first network and the second network are based on different technologies.

8. The apparatus according to claim 7, wherein the apparatus comprises one of a home- service- subscriber or a node of a Radio-Access-Network.

9. A method, comprising:
  receiving, by a user equipment, an assigned network identity, wherein the network identity is configured to identify the network identity as corresponding to a temporary offload identifier for authorizing offloading, wherein the network identity originates from a first network and is valid for the first network and a second network, and the first network and the second network are based on different technologies; and providing, by the user equipment, the network identity to the second network.

10. The method according to claim 9, further comprising determining, by the user equipment, that network traffic of the user equipment is to be offloaded from the first network to the second network.

11. The method according to claim 9, further comprising offloading the network traffic of the user equipment to the second network after the second network authorizes offloading.

12. The method according to claim 9, wherein the first network corresponds to a Radio-Access-Network, and the second network corresponds to a Wireless-Local- Area- Network.

13. An apparatus, comprising:
  at least one processor,
  and at least one non-transitory memory including computer program code,
  the at least one non-transitory memory and the computer program code configured to, with the at least one processor, cause the apparatus at least to perform:
  receive an assigned network identity, wherein the network identity is configured to identify the network identity as corresponding to a temporary offload identifier for authorizing offloading, wherein the network identity originates from a first network and is valid for the first network and a second network and the first network and the second network are based on different technologies;
  and provide the network identity to the second network.

14. The apparatus according to claim 13, wherein the apparatus comprises a user equipment.

15. A computer program product, embodied on a non-transitory computer readable medium, the computer program product configured to control a processor to perform a process comprising:
  receiving, by a user equipment, an assigned network identity, wherein the network identity is configured to identify the network identity as corresponding to a temporary offload identifier for authorizing offloading, wherein the network identity originates from a first network and is valid for the first network and a second network, and the first network and the second network are based on different technologies; and providing, by the user equipment, the network identity to the second network.

16. A method, comprising:
  receiving, by a network node, a network identity, wherein the network identity is configured to identify the network identity as corresponding to a temporary offload identifier for authorizing offloading, wherein a user equipment is associated with a first network, and the network node corresponds to a node of a second network, the network identity is valid for the first network and the second network, and the first network and the second network are based on different technologies.

17. The method according to claim 16, wherein the method further comprises determining whether the user equipment is authorized to offload traffic from the first network to the second network.

18. An apparatus, comprising:
  at least one processor,
  and at least one non-transitory memory including computer program code,
  the at least one non-transitory memory and the computer program code configured to, with the at least one processor, cause the apparatus at least to perform:
  receive a network identity, wherein the network identity is configured to identify the network identity as corresponding to a temporary offload identifier for authorizing offloading, wherein a user equipment is associated with a first network, and the apparatus corresponds to a node of a second network, the network identity is valid for the first network and the second network, and the first network and the second network are based on different technologies.

* * * * *